US009389899B2

(12) United States Patent
Tsirkin et al.

(10) Patent No.: US 9,389,899 B2
(45) Date of Patent: Jul. 12, 2016

(54) FAIR UNIDIRECTIONAL MULTI-QUEUE VIRTUAL MACHINE MIGRATION

(71) Applicant: Red Hat Israel, Ltd., Ra'anana (IL)

(72) Inventors: Michael S. Tsirkin, Ra'anana (IL); Karen Noel, Pembroke, NH (US)

(73) Assignee: Red Hat Israel, Ltd., Ra'anana (IL)

( * ) Notice: Subject to any disclaimer, the term of this patent is extended or adjusted under 35 U.S.C. 154(b) by 91 days.

(21) Appl. No.: 14/165,203

(22) Filed: Jan. 27, 2014

(65) Prior Publication Data
US 2015/0212844 A1 Jul. 30, 2015

(51) Int. Cl.
*G06F 9/45* (2006.01)
*G06F 9/445* (2006.01)
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| 7,716,530 | B2 * | 5/2010 | Verbowski et al. | 714/37 |
|---|---|---|---|---|
| 8,307,192 | B2 | 11/2012 | Pandey et al. | |
| 8,385,202 | B2 | 2/2013 | Kuik et al. | |
| 8,489,699 | B2 | 7/2013 | Goggin et al. | |
| 8,671,238 | B2 | 3/2014 | Mashtizadeh | |
| 8,719,800 | B2 * | 5/2014 | Chow et al. | 717/131 |
| 2006/0026577 | A1 * | 2/2006 | Dinechin et al. | 717/148 |
| 2009/0063749 | A1 | 3/2009 | Dow | |
| 2012/0017031 | A1 | 1/2012 | Mashtizadeh | |
| 2012/0166644 | A1 | 6/2012 | Liu et al. | |
| 2012/0324442 | A1 | 12/2012 | Barde | |
| 2014/0282439 | A1 * | 9/2014 | Kannan | 717/140 |

FOREIGN PATENT DOCUMENTS

EP 2309387 A1 10/2009

OTHER PUBLICATIONS

Caspi, Eylon, et al., Stream Computations Organized for Reconfigurable Execution (SCORE): Introduction and Tutorial, U.C. Berkeley Brass Group, http://web.mit.edu/~mmt/Public/papers/score_tutorial.pdf, Aug. 25, 2000.

(Continued)

*Primary Examiner* — Chuck Kendall
(74) *Attorney, Agent, or Firm* — Haynes & Boone, LLP

(57) ABSTRACT

Methods, systems, and computer program products for providing fair unidirectional multi-queue virtual machine migration are disclosed. A computer-implemented method may include maintaining a current scan identifier for each of a plurality of streams used to migrate a virtual machine from a first hypervisor to a second hypervisor, determining when a current scan identifier of a first stream and a current scan identifier of a second stream are associated with different memory states of the virtual machine, and adjusting processing of memory updates when the current scan identifiers are associated with different memory states of the virtual machine. The adjusting may be performed, for example, by pausing processing on each stream having a current scan identifier subsequent to the earliest current scan identifier determined for the streams, and processing memory updates on each stream having a current scan identifier matching the earliest current scan identifier.

42 Claims, 5 Drawing Sheets

(56) References Cited

OTHER PUBLICATIONS

Clark, Christopher, et al., Live Migration of Virtual Machines, USENIX Association, 2nd Symposium on Networked Systems Design & Implementation, NSDI 2005, pp. 273-286.

Zhao, Ming, et al., Experimental Study of Virtual Machine Migration in Support of Reservation of Cluster Resources, Advanced Computing and Information Systems Laboratory (ACIS) Electrical and Computer Engineering, University of Florida, http://users.cis.fiu.edu/~zhaom/research/vtdc07.pdf.

Broadcom, Broadcom Ethernet Network Controller Enhanced Virtualization Functionality, http://www/broadcom.com/collateral/wp/Virtualization-WP100-R.pdf, Oct. 2009.

Riteau, Pierre, et al., Shrinker: Efficient Wide-Area Live Virtual Machine Migration Using Distributed Content-Based Addressing, Universite de Rennes I, http://hal.inria.fr/inria-00454727/, 2010.

Microsoft, Virtual Machine Live Migration Overview, http://technet.microsoft.com/en-us/library/hh831435.aspx, Feb. 29, 2012.

Ye, Kejiang, et al., VC-Migration: Live Migration of Virtual Clusters in the Cloud, College of Computer Science, Zhejiang University Hangzhou, 2012 ACM/IEEE 13th International Conference on Grid Computing, http://www.academia.edu/2062161/VC-Migration_Live_Migration_of_Virtual_Clusters_in_the_Cloud, 2012.

Arye, Matvey, et al., A Formally-Verified Migration Protocol for Mobile, Multi-Homed Hosts, Appeared in 20th IEEE International Conference on Network Protocols (ICNP '12), http://www.cs.princeton.edu/~enordstr/papers/icnp12.pdf, 2012.

Sturm, Simon, Interconnect Adapter State Migration for Virtual HPC Clusters, Karlsruher Institut fur Technologie (KIT), http://os.ibds.kit.edu/downloads/da_2013_sturm-simon_interconnect-adapter.pdf, 2013.

\* cited by examiner

FAIR UNIDIRECTIONAL MULTI-QUEUE VIRTUAL MACHINE MIGRATION

TECHNICAL FIELD

Examples of the present disclosure generally relate to virtual machines, and more specifically, relate to virtual machine migration.

BACKGROUND

A virtual machine is a software-based implementation of a physical computing environment that includes its own virtual resources (e.g., CPU, RAM, disk storage, network connectivity). It may be useful to migrate a virtual machine to a different physical host or to another location on the same host. For example, virtual machine migration may facilitate load balancing, computer system maintenance, energy conservation, geographic relocation, and business continuity.

Virtual machine migration performed over a standard TCP connection is usually limited by flow control, which throttles the data transfer rate to guarantee reliable delivery. In addition, TCP processing errors can disrupt the speed of data transfer. These inefficiencies increase the duration of virtual machine migration and also the risk that virtual machine state may not converge during live migration.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
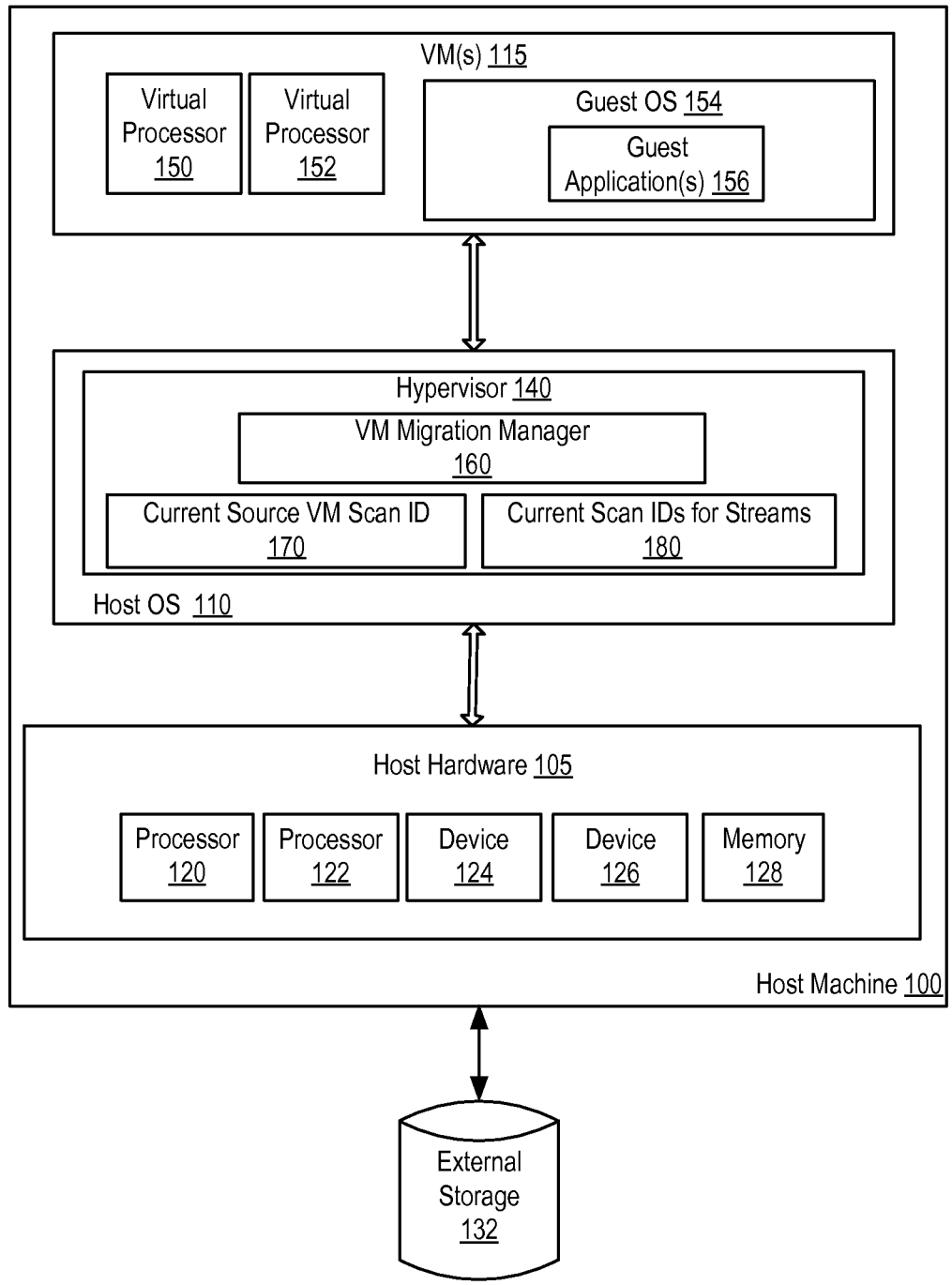
FIG. 1 is a block diagram illustrating an example of a computer system that hosts one or more virtual machines.

Disclosed herein are systems, methods, and computer program products for providing fair unidirectional multi-queue virtual machine migration.

In an example, a virtual machine on a source hypervisor may be migrated to a destination hypervisor using a plurality of streams. A destination hypervisor preserves ordering of memory updates received on the streams using current scan identifiers it tracks for each stream.

In an example, a hypervisor maintains a current scan identifier for each of a plurality of streams used to migrate a virtual machine. In one example, a hypervisor receives a scan identifier for a memory update on a first stream. The hypervisor tracks the scan identifier as the current scan identifier for the first stream. The hypervisor receives a scan identifier for another memory update on a second stream. The hypervisor tracks the scan identifier received on the second stream as the current scan identifier for the second stream. The hypervisor also may track a current scan identifier for each of any number of additional streams.

In an example, a hypervisor determines that the current scan identifier of the first stream and the current scan identifier of the second stream are associated with different memory states of a virtual machine. For example, the hypervisor may compare the scan identifier of the first stream to the scan identifier of the second stream to determine whether the current scan identifiers match. In an example, the hypervisor identifies an earliest current scan identifier from the streams to determine which stream has memory updates that should be processed first.

In an example, a hypervisor adjusts memory update processing when it detects that current scan identifiers are associated with different memory states of a virtual machine. For example, the hypervisor may pause processing on each stream with a current scan identifier that occurs later in time or sequence when compared to an earliest current scan identifier of the streams. The hypervisor then may process memory updates on the streams having a current scan identifier that matches the earliest current scan identifier to ensure that memory updates for various scans received across the different streams are applied in order on a destination virtual machine. The hypervisor may repeat the process when performing migration of a virtual machine.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a physical computer system, referred to herein as a host machine 100, that hosts one or more virtual machines (VMs) 115. Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, memory 128, and other hardware components. Memory 128 may include volatile memory devices (e.g., random access memory (RAM)), non-volatile memory devices (e.g., flash memory), and/or other types of memory devices. Host hardware 105 also may be coupled to external storage 132 via a direct connection or a local network. Host machine 100 may be a single machine or multiple host machines arranged in a cluster.

The term "processor," as used herein, refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with host machine 100 (e.g., notify host machine 100 of events) by generating device interrupts.

Host machine 100 includes a hypervisor 140 (also known as a virtual machine monitor (VMM)). In one example (as shown), hypervisor 140 is a component of a host operating system 110. Alternatively, hypervisor 140 may run on top of a host OS 110, or may run directly on host hardware 105 without the use of a host OS 110.

Hypervisor 140 manages system resources, including access to memory 128, devices 124, 126, secondary storage, and so on. Hypervisor 140, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 140 presents to other software (i.e., "guest" software) the abstraction of one or more virtual machines (VMs) 115, which may provide the same or different abstractions to various guest software (e.g., guest operating system, guest applications).

Host machine 100 hosts any number of virtual machines (VMs) 115 (e.g., a single VM, one hundred VMs, etc.). A virtual machine 115 is a combination of guest software that uses an underlying emulation of host machine 100 (e.g., as provided by hypervisor 140). Guest software may include a guest operating system 154, guest applications 156, guest device drivers (not shown), etc. Virtual machines 115 can be, for example, hardware emulation, full virtualization, para-virtualization, and operating system-level virtualization virtual machines. Virtual machines 115 may have the same or different guest operating systems 154, such as Linux®, Solaris®, Microsoft® Windows®, etc.

Each virtual machine 115 may include multiple virtual processors 150, 152. Each virtual processor 150, 152 of a virtual machine 115 executes on a specific processor 120, 122 of host machine 100. Hypervisor 140 may control which virtual processors 150, 152 run on which hardware processors 120, 122. For example, virtual processor 150 may run on processor 120, and virtual processor 152 may run on processor 122 (or vice versa).

Hypervisor 140 includes a virtual machine (VM) migration manager 160, a current source VM scan ID 170, and current scan IDs for streams 180. Hypervisor 140 may use VM migration manager 160 to migrate a virtual machine from one hypervisor to another hypervisor, for example, on the same host or a different host. Hypervisor 140 may use current source VM scan ID 170 to track a current scan identifier associated with a memory state of a virtual machine. For example, a source hypervisor 140 may send scan identifiers and associated memory updates to a destination hypervisor 140 over numerous streams when migrating a virtual machine.

A destination hypervisor 140 may use current scan IDs for streams 180 to track a current scan identifier received on each respective stream used to migrate a virtual machine. In an example, a destination hypervisor 140 may track current scan IDs for streams 180 to ensure that memory updates from various scans received on different streams are applied in a correct order at the destination (e.g., on a destination virtual machine). For example, a destination hypervisor 140 may determine an earliest current scan identifier from the current scan IDs for streams 180. The destination hypervisor 140 then may pause processing on each stream having a current scan identifier subsequent to (i.e., later than) the determined earliest scan identifier. The destination hypervisor 140 then may process memory updates on one or more streams having a current scan identifier matching the determined earliest current identifier determined for the streams. The destination hypervisor 140 may continue processing memory updates received on the streams in the same manner when continuing to perform virtual machine migration.

Virtual machine migration generally describes the copying of virtual machine memory state from a source hypervisor to a destination hypervisor. For example, a virtual machine may be migrated to a different location on the same physical host or to a different physical host. Further, virtual machines (VMs 115) may be migrated online or offline.

In an example, offline virtual machine migration is performed by suspending activity on a virtual machine, transferring a copy of the virtual machine's memory image from a source hypervisor to a destination hypervisor (e.g., on the same host as the source hypervisor or on a different host), and resuming the virtual machine and processing at the destination hypervisor. Offline virtual machine migration uses downtime to transfer a suspended virtual machine's memory state from the source hypervisor to the destination hypervisor.

Online virtual machine migration, often called "live migration," allows a virtual machine to continue running and to remain available to clients while the virtual machine's state is iteratively copied to a destination hypervisor. In an example, a source hypervisor 140 on a source host may copy a first point in time snapshot of a virtual machine's memory state to a destination hypervisor on the same host or a destination hypervisor on a different host. Hypervisor 140 also may detect and track modifications to the virtual machine's memory state that occur as an online virtual machine continues to process client requests.

In an example, a source hypervisor 140 transfers a copy of modified memory areas to a destination hypervisor 140 while continuing to detect and track a next set of modifications to a virtual machine's memory state. For example, a source hypervisor 140 may transfer virtual machine memory state updates to a destination hypervisor 140 in one or more sequential stages during live migration. The process may continue until the active memory state of a virtual machine on a source hypervisor 140 converges with the memory state of a virtual machine on a destination hypervisor 140.

In an example, a source hypervisor 140 may quiesce or briefly suspend a virtual machine on the source hypervisor 140 while a minimal and final set of remaining updates are transferred to the destination hypervisor 140. Virtual machine processing then resumes on the destination hypervisor 140 where clients are automatically and seamlessly reconnected. In one example, a final cut-over phase may occur in a period of milliseconds so that the transition from the source hypervisor to the destination hypervisor is unnoticeable to clients.

A hypervisor 140 may use VM migration manager 160 to migrate a virtual machine. For example, VM migration manager 160 may create a plurality of streams to connect a source hypervisor 140 on a source host with a destination hypervisor 140 on a destination host. In an example, VM migration manager 160 may create new streams, enable streams, disable streams, close streams, and send notifications to inform source and destination hypervisors 140 about a status of one or more streams.

In an example, a source hypervisor 140 may use VM migration manager 160 to send state of a virtual machine (e.g., memory, CPU, devices, etc.) to a destination hypervisor 140 on the same host or on a different host during live migration. For example, a source hypervisor 140 may use VM migration manager 160 to transfer memory state of a virtual machine in segments over a plurality of streams to a destination hypervisor 140.

A "segment" generally refers to any subset, portion, piece, or region of a virtual machine's memory state. Such "areas of memory" or "memory areas" may include, but are not limited to one or more pages, blocks, extents, or any other measurable unit(s) corresponding to the state of a virtual machine. In one example, state of a virtual machine is not limited to memory per se and also may include, for example, state of one or more virtual processors, state of one or more virtual devices, etc.

A source hypervisor 140 also may use VM migration manager 160 to detect and track areas of memory that have changed on a virtual machine over time. In an example, a VM migration manager 160 of a source hypervisor 140 detects and tracks memory pages that have been updated during live migration of a virtual machine. For example, VM migration manager 160 may iteratively scan the memory state of a virtual machine to determine which pages have changed since its most recent scan.

In an example, VM migration manager 160 of a source hypervisor 140 may use scan identifiers (e.g., scan numbers) to keep track of sequential sets of memory updates corresponding to periodic scans of a virtual machine's memory state. In one example, a scan identifier generally refers to and may be any numeric or alphanumeric field(s), variable(s), counter(s), or any other mechanism that can be used to track and/or indicate a logical ordering or sequence of updates.

In an example, VM migration manager 160 of a source hypervisor 140 may assign a first scan identifier to a first set of memory updates corresponding to a first memory state of a virtual machine. For example, each memory page in a virtual machine may be assigned or associated with the first scan identifier when a live migration begins. VM migration manager 160 then may begin to transfer a copy of the memory pages associated with the first scan identifier to a destination hypervisor 140 when performing a migration, such as a live migration.

In an example, VM migration manager 160 of a source hypervisor 140 may detect and track memory pages updated during a live migration. For example, at a second point in time, memory pages that have been updated since an initial state (or a most recent scan) are assigned to or associated with a second scan identifier corresponding to the second memory state of the virtual machine. VM migration manager 160 then may begin transferring a copy of the updated memory pages (i.e., memory updates) associated with the second (e.g., or next) scan identifier to a destination hypervisor 140.

In one example, VM migration manager 160 of a source hypervisor 140 continues tracking and transferring memory updates throughout a live migration. For example, such processing may continue until a virtual machine's memory state is mostly or entirely synchronized with a virtual machine of a destination hypervisor (e.g., so that processing can be transitioned to the destination hypervisor in a brief, final cut-over that is unnoticeable to clients).

In an example, VM migration manager 160 of a source hypervisor 140 may send memory updates corresponding to a memory state of a virtual machine to a destination hypervisor 140 over a plurality of streams. In one example, VM migration manager 160 sends the memory updates unidirectionally over the plurality of streams to a destination hypervisor 140.

Transferring the memory state of a virtual machine unidirectionally over a plurality of streams provides several benefits. For example, the memory state of a virtual machine may be transferred in parallel over multiple streams, to provide better performance than a single connection. Further, unidirectional data transfer allows data to be transferred continuously without waiting for acknowledgment from the destination. In addition, various streams can be configured to utilize different network paths to load balance data transfer and to more effectively utilize available network resources. Streams also may be configured to utilize different network resources to provide increased stability and to guard against failure.

In an example, VM migration manager 160 of a source hypervisor 140 "live migrates" a virtual machine from a source host to a destination host using one or more streams. In one example, the streams connect a source hypervisor running on a source host with a destination hypervisor running on a destination host (which may be the same as or different from the source host).

In an example, VM migration manager 160 of a source hypervisor 140 selects the streams it will use to transfer each of various memory updates used to migrate a virtual machine to a destination hypervisor (e.g., either on the same host or on a different host). For example, VM migration manager 160 may select the streams randomly or on a round robin basis. Such methods are generally considered "fair" as processing of memory updates is distributed relatively evenly across available streams.

In an example, VM migration manager 160 of a source hypervisor 140 selects streams on a round robin rotation. For example, VM migration manager 160 may distribute thirty memory updates corresponding to a memory state of a virtual machine evenly across three streams so that each stream is used to send ten memory updates to a destination host.

In one example, VM migration manager 160 of a source hypervisor 140 selects a first stream to send a first memory update, a second stream to send a second memory update, a third stream to send a third memory update, the first stream to send a fourth memory update, the second stream to send a fifth memory update, the third stream to send a sixth memory update, and so on. Thus, VM migration manager 160 may continue sending remaining updates in a similar manner or in any order to evenly and fairly balance distribution of the remaining updates across available streams. VM migration manager 160 also may select streams randomly, for example, based on a random number or a random function used to choose an available stream.

In an example, VM migration manager 160 of a source hypervisor 140 sends a series (e.g., a group or collection) of memory updates on a selected stream. For example, VM migration manager 160 may send two, three, five, ten, or any number of memory updates on each stream that it selects on a round robin or random basis. Thus, VM migration manager 160 may send more than a single update on each selected stream at one time.

In an example, VM migration manager 160 of a source hypervisor 140 sends a scan identifier associated with memory state of a virtual machine with each corresponding memory update sent on a selected stream. For example, VM migration manager 160 may provide a scan number associated with each updated memory page it sends on a selected stream.

In an example, VM migration manager 160 of a source hypervisor 140 sends a scan identifier once on a stream for one or more associated memory updates. For example, VM migration manager 160 may send a new scan number (e.g., current source VM scan ID 170) on one or more available streams, when beginning a new scan.

In an example, VM migration manager 160 of a destination hypervisor 140 may receive memory updates corresponding to a memory state of a virtual machine, for example, during a live migration. In an example, a destination hypervisor 140 uses VM migration manager 160 to receive, prioritize, and apply memory updates in order when transferring memory state of a virtual machine between a source hypervisor and a destination hypervisor during virtual machine migration.

In an example, VM migration manager 160 of a destination hypervisor 140 receives memory updates sent unidirectionally from a source hypervisor 140. For example, memory updates may flow from the source hypervisor to the destination hypervisor 140 without acknowledgement or response from a destination hypervisor 140.

In an example, unidirectional data transfer provides increased performance because acknowledgments and follow-up communication do not occur. However, since communication only flows from the source to the destination, a source hypervisor is not aware of when processing of memory updates associated with a particular scan identifier are complete on the destination host. In addition, a destination hypervisor is generally unaware of when a source host begins a new scan. Therefore, VM migration manager 160 on a destination hypervisor 140 may start to receive memory updates corresponding to a next (second) memory state on one or more of the streams as processing of memory updates corresponding to a first memory state continues on some streams.

In an example, VM migration manager 160 of a destination hypervisor 140 monitors streams for incoming scan identifiers and associated memory updates. VM migration manager 160 also may prioritize and process memory updates using associated scan identifiers.

In an example, VM migration manager 160 of a destination hypervisor 140 tracks a current scan identifier for each stream used to migrate a virtual machine. For example, VM migration manager 160 of a destination hypervisor 140 may use a reserved area of memory to track a current scan identifiers for available streams (e.g., current scan IDs for streams 180).

In an example, VM migration manager 160 of a destination hypervisor 140 determines when current scan identifiers it tracks for each stream are associated with different memory states of a virtual machine. For example, VM migration manager 160 may compare current scan identifiers it tracks for two or more streams to determine whether processing of memory updates received on the streams should be adjusted.

In an example, VM migration manager 160 of a destination hypervisor 140 adjusts processing of memory updates when current scan identifiers it tracks for each stream are associated with different memory states of a virtual machine. In an example, VM migration manager 160 may pause processing on each stream having a current scan identifier occurring later in time or sequence when compared to an earliest current scan identifier determined for the streams. The hypervisor then may process memory updates on the streams having a current scan identifier that matches the earliest current scan identifier to ensure that memory updates from different scans received on different streams are applied in order. Such processing may be repeated as existing memory updates are processed and new memory updates and scan identifiers are received on the streams.

Figure 2:
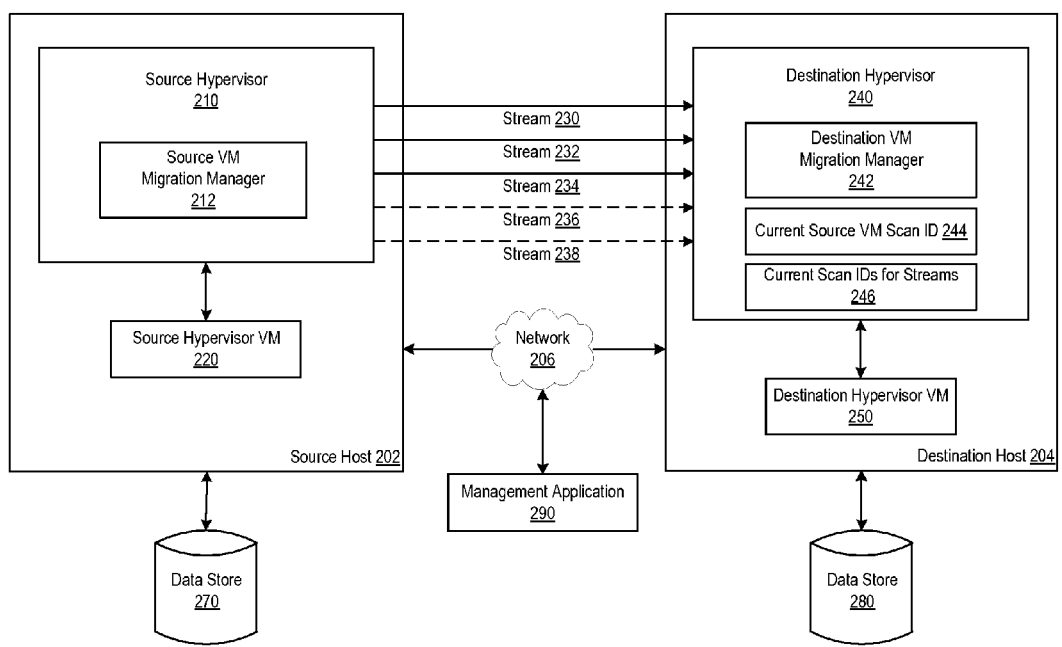
FIG. 2 illustrates an exemplary system architecture for fair unidirectional multi-queue virtual machine migration, in accordance with various examples of the present disclosure.

FIG. 2 is a diagram illustrating an exemplary system architecture 200 for fair unidirectional multi-queue virtual machine (VM) migration, in accordance with various examples of the present disclosure. System architecture 200 includes source host 202, destination host 204, network 206, source hypervisor 210, source VM migration manager 212, current source VM scan ID 214, source hypervisor VM 220, streams (230, 232, 234, 236 and 238), destination hypervisor 240, destination VM migration manager 242, current scan IDs for streams 246, destination hypervisor VM 250, data store 270, data store 280, and management application 290.

In an example, source host 202 and destination host 204 are physical computing systems connected by network 206. Network 206 may be a public network (e.g., the Internet), a private network (e.g., a local area network (LAN)), a wide area network (WAN)), or a combination thereof.

Source host 202 includes source hypervisor 210, source VM migration manager 212, current source VM scan ID 214, and source hypervisor VM 220. Source host 202 may be coupled to external storage 270 (e.g., network storage) via a direct connection or a local network.

Destination host 204 includes destination hypervisor 240, destination VM migration manager 242, current scan IDs for streams 246 and destination hypervisor VM 250. Destination host 204 may be coupled to external storage 280 (e.g., network storage) via a direct connection or a local network. In some examples, external storage 270 and 280 may be shared storage. External storage 270 and 280 also may be non-shared storage.

Management application 290 may include one or more software applications that may be used, for example, by a system administrator to initiate and manage one or more aspects of virtual machine migration. For example, management application 290 may be used to select a source hypervisor VM 220 on a source host 202 for migration to a destination hypervisor VM 250 (e.g., on the same host or a different host).

Management application 290 also may be used to define and configure one or more active streams 230, 232 and 234 to migrate a source hypervisor VM 220 to destination hypervisor VM 250. Management application 290 also may be used to create and/or utilize one or more additional (e.g., reserve) streams 236 and 238 as virtual machine migration is performed.

Streams (e.g., 230, 232, 234) are generally any communication path that can be used to transmit data (e.g., to send state of a source hypervisor VM 220 to a destination hypervisor VM 250). For example, a plurality of streams may include, but is not limited to, standard TCP streams (e.g., TCP sockets), unidirectional TCP flows, one or more files, Unix sockets, named pipes, etc. In addition, streams may be processed in parallel by multiple threads or by a single thread, for example, using round-robin processing. In an example, streams 230, 232, 234, 236 and 238 are unidirectional. Thus, data may flow from source hypervisor 210 to destination hypervisor 240 without return communication from destination hypervisor 240.

In an example, source hypervisor VM 220 is migrated to destination hypervisor VM 250 on a destination host 204 (or the same host). For example, a memory state of source hypervisor VM 220 may be transferred (i.e., copied) to destination hypervisor VM 250 in an offline migration or a live migration.

In an example, a source hypervisor VM 220 is migrated to destination hypervisor VM 250 in a live migration. During the live migration, source hypervisor 210 may monitor and track changes to memory pages of source hypervisor VM 220. For example, source hypervisor 210 may detect or receive notification that one or more memory pages have been updated.

In an example, a source hypervisor 210 tracks modified memory pages in a bitmap (e.g., where each bit corresponds to a memory page). Source hypervisor 210 associates each set of memory page updates with a sequential scan identifier indicating a position in a series of periodic memory updates over time. Source hypervisor 210 sends copies of updated memory pages and an associated scan identifier to destination hypervisor 240 over streams 230, 232 and 234. In one example, source hypervisor 210 clears the bitmap, increments the scan identifier and repeats the process until the live migration can converge.

In an example, destination hypervisor 240 receives scan identifiers and associated memory updates on streams 230, 232 and 234. Destination hypervisor 240 then updates the memory state of destination hypervisor VM 250 by applying the memory updates, for example, in order based on a sequence of scan identifiers associated with each memory update.

In an example, destination hypervisor 240 tracks a current scan identifier for each stream 230, 232, 234 based on a most recent scan identifier received on each respective stream. For example, destination hypervisor 240 may use an area of memory to track current scan IDs for streams 246. In one example, destination hypervisor 240 updates the current scan identifier for a stream when an initial or new scan identifier is received on the stream.

In an example, destination hypervisor 240 determines when memory updates received on streams are associated with different scans of a source hypervisor VM 220 by comparing current scan identifiers of the streams. In an example, destination hypervisor 240 adjusts processing of memory updates when current scan identifiers are associated with different scans (i.e., different memory states of a source virtual machine).

In an example, destination hypervisor 240 prioritizes memory updates according to current scan identifiers by determining an earliest current scan identifier among the streams. In one example, destination hypervisor 240 pauses processing on each stream where the current scan identifier does not match the earliest scan identifier while processing continues on any stream having a current scan identifier equal to the earliest scan identifier.

In an example, streams 236 and 238 are created and enabled for use when migrating source hypervisor VM 220 to destination hypervisor VM 250. For example, streams may be created and/or enabled to accelerate a migration so that it completes within a period of time (e.g., according to a service level agreement (SLA)).

In one example, source hypervisor 210 may send scan numbers to destination hypervisor 240 when two or more streams are active in a live migration. Thus, scan numbers may not be sent to destination hypervisor 240 when migration is performed using a single stream.

In an example, a plurality of streams 230, 232 and 234 may be used to accelerate an offline virtual machine migration. In one example, scan numbers may not be utilized in an offline, multi-stream virtual machine migration when a source hypervisor VM 220 memory state is suspended (i.e., frozen) and does not change.

Figure 3:
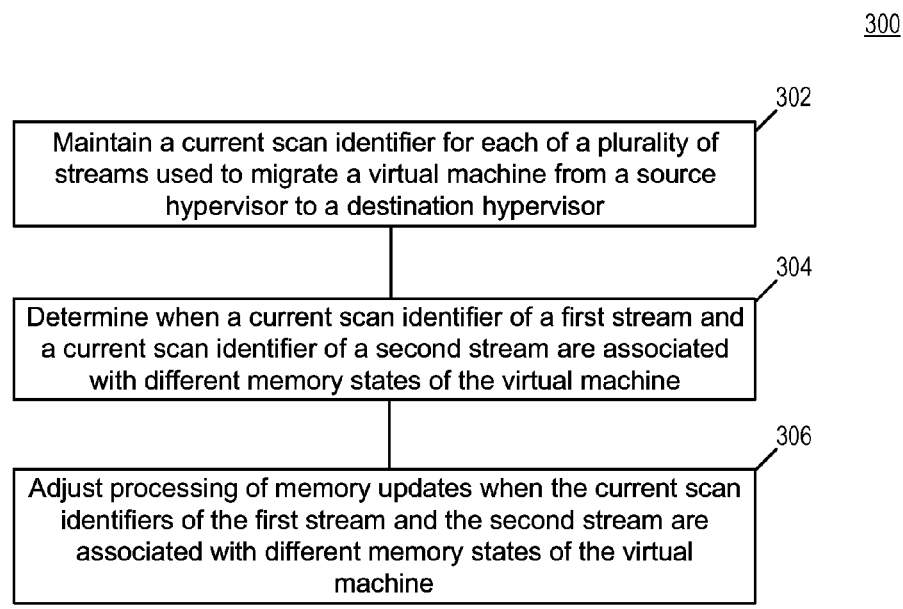
FIG. 3 is a flow diagram illustrating an example of a method for providing fair unidirectional multi-queue virtual machine migration in a hypervisor.

FIG. 3 is a flow diagram illustrating an example of a method for providing fair unidirectional multi-queue virtual machine migration in a hypervisor. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by hypervisor 140 of FIG. 1.

Method 300 begins at block 302 when a hypervisor 140 maintains a current scan identifier for each of a plurality of streams used to migrate a virtual machine from a source hypervisor to a destination hypervisor. In an example, VM migration manager 242 of destination hypervisor 240 receives scan identifiers and associated memory updates on one or more streams 230, 232, 234. For example, a scan identifier may be sent prior to or with a memory update to indicate which sequential source hypervisor VM 220 scan is associated with the memory update.

In an example, VM migration manager 242 of destination hypervisor 240 maintains an area of memory (e.g., current scan IDs for streams 246) to track a current scan identifier for each stream 230, 232, 234. In one example, VM migration manager 242 of a destination hypervisor 240 records or updates a value used to track a current scan identifier for a stream when a new scan identifier is received on the stream. In one example, VM migration manager 242 of destination hypervisor 240 tracks current scan identifiers for each stream 230, 232, 234 to prioritize processing of memory updates from different scans pending on two or more of the streams.

At block 304, the hypervisor 140 determines when a current scan identifier of a first stream and a current scan identifier of a second stream are associated with different memory states of the virtual machine. In an example, VM migration manager 242 of destination hypervisor 240 compares a current scan identifier it tracks for a first stream (e.g., stream 230) to a current scan identifier that it tracks for the second stream (e.g., stream 232) to determine whether the current scan identifiers it tracks for the streams match. Generally, when the current scan identifiers of different stream match, then memory updates associated with the streams originated from the same memory scan. However, when the current scan identifiers of different streams do not match, then processing on the streams should be prioritized according to the current scan identifiers for the streams to ensure that memory updates are applied in a correct sequential order.

At block 306, the hypervisor 140 adjusts processing of memory updates received on the streams when the current scan identifiers of the first stream and the second stream are associated with different memory states of the virtual machine. In an example, VM migration manager 242 of destination hypervisor 240 determines an earliest current scan identifier among multiple streams by comparing and/or sorting current scan identifiers that it tracks for each stream. In one example, VM migration manager 242 of destination hypervisor 240 pauses processing on each stream having a current scan identifier (e.g., scan ID #2, scan ID #3) following the earliest current scan identifier (e.g., scan ID #1) determined among the streams to preserve ordering of memory updates. VM migration manager 242 of destination hypervisor 240 then processes, memory updates on each stream having the determined earliest current scan identifier (e.g., scan ID #1).

In an example, VM migration manager 242 of destination hypervisor 240 determines a new earliest current scan identifier (e.g., scan ID #2) when processing of memory updates on streams for an existing earliest current scan identifier (e.g., scan ID #1) is complete. In one example, VM migration manager 242 of destination hypervisor 240 pauses (or continues to pause) processing on streams having a current scan identifier (e.g., scan ID #3) that follows the new current scan identifier (e.g., scan ID #2) and processes memory updates on streams having the new current scan identifier.

Figure 4:
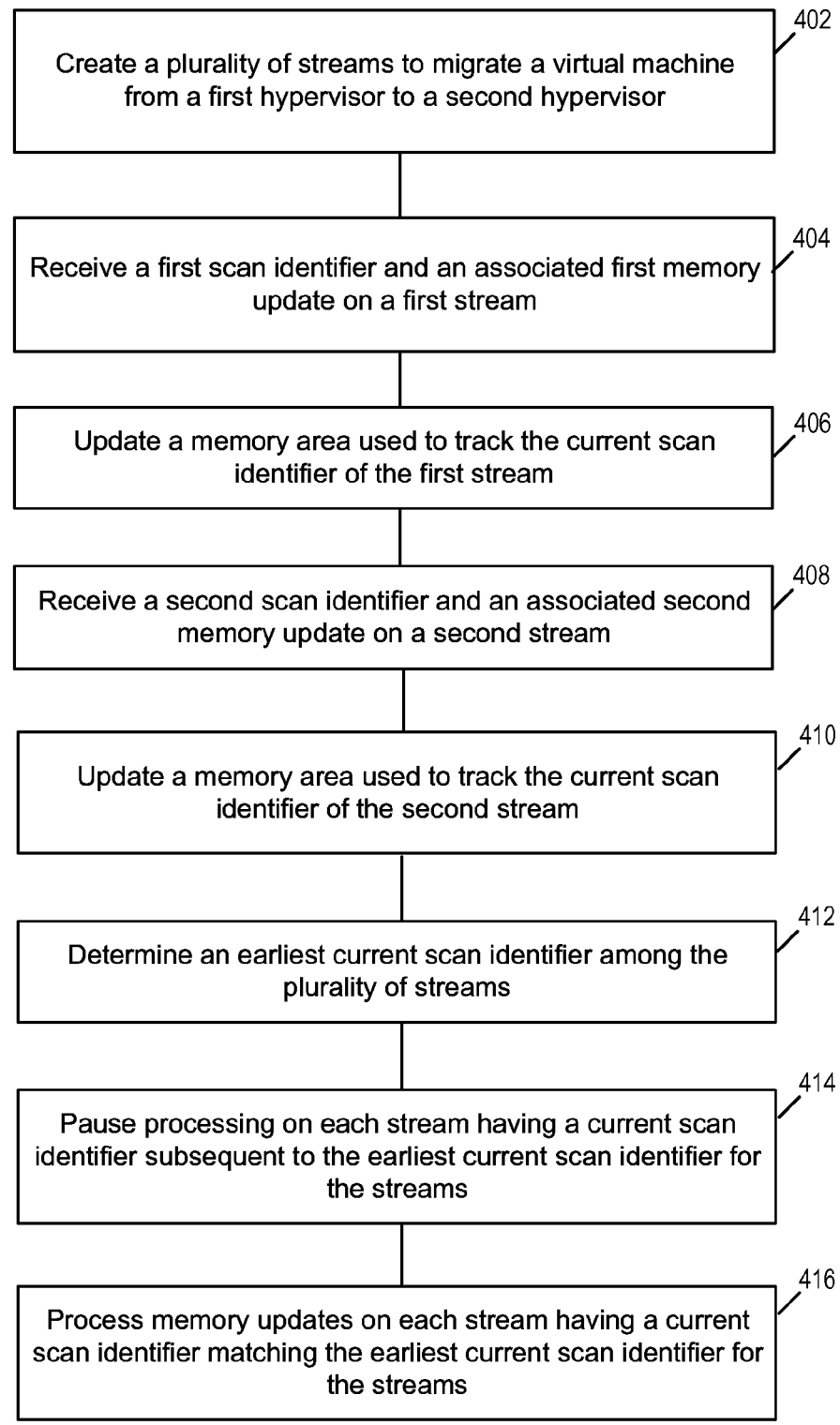
FIG. 4 is a flow diagram illustrating an example of a method for managing a plurality of memory updates when performing fair unidirectional multi-queue virtual machine migration.

FIG. 4 is a flow diagram illustrating an example of a method for managing a plurality of memory updates when performing fair unidirectional multi-queue virtual machine migration. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by the hypervisor 140 of FIG. 1.

Method 400 begins at block 402 when a plurality of streams are created to migrate a virtual machine from a first hypervisor to a second hypervisor. In an example, a source hypervisor 210, destination hypervisor 240, a management application 290, or any combination thereof, may be used to create new streams, to enable or disable existing streams, and/or to close existing streams.

In an example, a system administrator managing virtual machine migration may configure an initial number of streams that connect a source hypervisor 210 to a destination hypervisor 240, or a default number of streams may be used. In one example, a system administrator or a hypervisor involved in a migration may increase or decrease a number of streams used at any time, including when migrating a virtual machine from a source hypervisor VM 220 to a destination hypervisor VM 250. For example, new streams may be created, reserve streams (e.g., streams 236, 238) may be enabled, enabled streams may be disabled and placed in reserve, and any stream may be closed.

In an example, a request is received to create an additional stream to use when migrating a virtual machine. A new stream may be created, for example, in an enabled, disabled, or reserve state in response to the request. Further, notification may be sent to one or more hypervisors (e.g., a source hypervisor 210 and/or a destination hypervisor 240) to inform the hypervisor(s) of the newly created stream.

In an example, a source hypervisor 210 and a destination hypervisor 240 may send and receive notifications indicating that one or more additional streams are available for use. In some examples, stream processing of one or more available streams (e.g., all streams) may be paused temporarily until a scan identifier of a newly created or enabled stream can be determined. In one example, a new stream is considered to have completed scan-infinity and processing on other streams may be paused until a current scan identifier for the new stream can be determined or data is received on the new stream. In one example, determining an earliest current scan identifier among a plurality of streams is delayed until a current scan identifier for a new stream is determined.

In an example, a request is received to close a stream. A notification may be sent to inform one or more hypervisors (e.g., a source hypervisor 210, a destination hypervisor 240) that the stream has or will become unavailable. In one example, unfinished processing for the stream is allowed to complete before the stream is closed. The stream is then closed in response to the request.

In an example, a source hypervisor 210 and a destination hypervisor 240 may receive notification that one or more streams have become unavailable (e.g., disabled, closed). In one example, a source hypervisor 210 does not send data on a stream that it knows to be disabled or closed. In another example, a destination hypervisor 240 does not wait for data on a stream that it knows to be disabled or closed. In one example, a VM migration manager 242 of a destination hypervisor 240 excludes (i.e., does not use) disabled or closed streams when determining an earliest current scan identifier for available streams.

At block 404, a hypervisor 140 receives a first scan identifier and an associated first memory update on a first stream. In an example, destination VM migration manager 242 of destination hypervisor 240 receives a memory update with an associated scan identifier from a source hypervisor VM 220 on a stream (e.g., stream 230). For example, VM migration manager 242 may receive a modified memory page and an associated scan identifier corresponding to a memory state of source hypervisor VM 220.

In an example, a scan identifier may be received together with each individual modified memory page on a stream. A scan identifier also may be received once for multiple modified memory pages sent together or in succession on a stream. Further, a scan identifier may be broadcast to and received on each available stream when a new scan is initiated by a source hypervisor 210, for example, to protect against deadlocks. In one example, a source VM migration manager 212 sends a current source VM scan ID 214 on each stream (e.g., 230, 232, 234) when a new scan begins on source hypervisor VM 220 to avoid deadlocks, regardless of whether any memory update will be sent on each stream, At block 406, the hypervisor 140 updates a memory area used to track the current scan identifier of the first stream. In an example, destination VM migration manager 242 of destination hypervisor 240 updates a memory area it maintains to track the current scan identifier for the first stream. For example, destination VM migration manager 242 of destination hypervisor 240 may update a current scan IDs for streams 246 record or value associated with the first steam to include information about a latest (e.g., most recent) scan identifier received on the first stream.

At block 408, the hypervisor 140 receives a second scan identifier and an associated second memory update on a second stream. In an example, destination VM migration manager 242 of destination hypervisor 240 receives a second memory update with an associated scan identifier from a source hypervisor VM 220 on the second stream (e.g., stream 232). For example, VM migration manager 242 may receive a scan identifier prior to or with an associated memory update corresponding to a virtual machine memory state.

At block 410, the hypervisor 140 updates a memory area used to track the current scan identifier of the second stream. In an example, destination VM migration manager 242 of destination hypervisor 240 updates a memory area it maintains to track the current scan identifier for the second stream. For example, destination VM migration manager 242 may update a current scan IDs for streams 246 record or value for the second steam to include information about a latest scan identifier received on the second stream.

At block 412, the hypervisor 140 determines an earliest current scan identifier among the plurality of streams. In an example, scan identifiers received on each stream may match or may differ at a point time. For example, different memory updates occurring during the same scan on a source hypervisor VM 220 may be sent and received in parallel on different streams. Also, different memory updates from different scans also may be sent and received at the same time on different streams (e.g., streams 230, 232, 234).

Generally, when scan identifiers received on different streams match, then corresponding memory updates associated with the matching scan identifiers usually are from the same scan. In contrast, when scan identifiers received on different streams do not match, then corresponding memory updates associated with the dissimilar scan identifiers are usually from different scans.

In an example, memory updates from the same scan may be processed in parallel on different streams. However, memory updates from different scans received on various streams should be applied in sequential order to preserve integrity of a virtual machine migration, for example, so that a memory area update is not overwritten by an update to the same memory area from an earlier scan.

In an example, to preserve ordering of memory updates from different scans received on various streams, corresponding memory updates may be applied to a destination hypervisor VM 250 in order using current scan IDs for streams 246. For example, a destination VM migration manager 242 of destination hypervisor 240 may identify an earliest current scan identifier from current scan identifiers it tracks for a plurality of streams used to migrate a virtual machine. In one example, destination VM migration manager 242 of destination hypervisor 240 identifies the earliest current scan identifier so that it may determine whether to process and/or to hold processing of memory updates on each stream.

In one example, VM migration manager 242 of destination hypervisor 240 identifies an earliest current scan identifier for multiple streams by sorting current scan identifiers that it tracks for each stream (e.g., current scan IDs for streams 246). In one example, VM migration manager 242 of destination hypervisor 240 may compare current scan identifiers of two or more streams or use a function to determine an earliest scan identifier. Current scan identifiers may be sorted or compared, for example, as numeric values, timestamps, or in any other form that allows a sequence or ordering of current scan identifiers to be determined. In one example, a VM migration manager 242 of a destination hypervisor 240 excludes (i.e., does not use) disabled or closed streams when determining an earliest current scan identifier for available streams.

At block 414, the hypervisor 140 pauses processing on each stream having a current scan identifier subsequent to the earliest current scan identifier determined for the streams. In an example, destination VM migration manager 242 of destination hypervisor 240 pauses processing of memory updates on each stream having a current scan identifier that does not match the earliest current scan identifier (e.g., those occurring later in sequence or time when compared to the earliest current scan identifier). In one example, destination VM migration manager 242 of destination hypervisor 240 pauses processing on streams having memory updates from a subsequent scan to ensure that memory updates for a virtual machine migration are applied to a destination hypervisor VM 250 in a correct order.

At block 416, the hypervisor 140 processes memory updates on each stream having a current scan identifier matching the earliest current scan identifier determined for the streams. In an example, destination VM migration manager 242 of destination hypervisor 240 processes memory updates on one or more streams having a current scan identifier that matches the earliest scan identifier for the streams. VM migration manager 242 of destination hypervisor 240 may process such updates while holding processing on streams having a current scan identifier occurring after the earliest scan identifier to ensure memory updates are applied in a correct order.

In an example, VM migration manager 242 of destination hypervisor 240 continues identifying the earliest scan identifier among the streams, processing memory updates on streams with a current scan identifier matching the earliest scan identifier, and holding memory update processing on other streams to preserve ordering of memory updates when performing live migration of a virtual machine using multiple streams.

Figure 5:
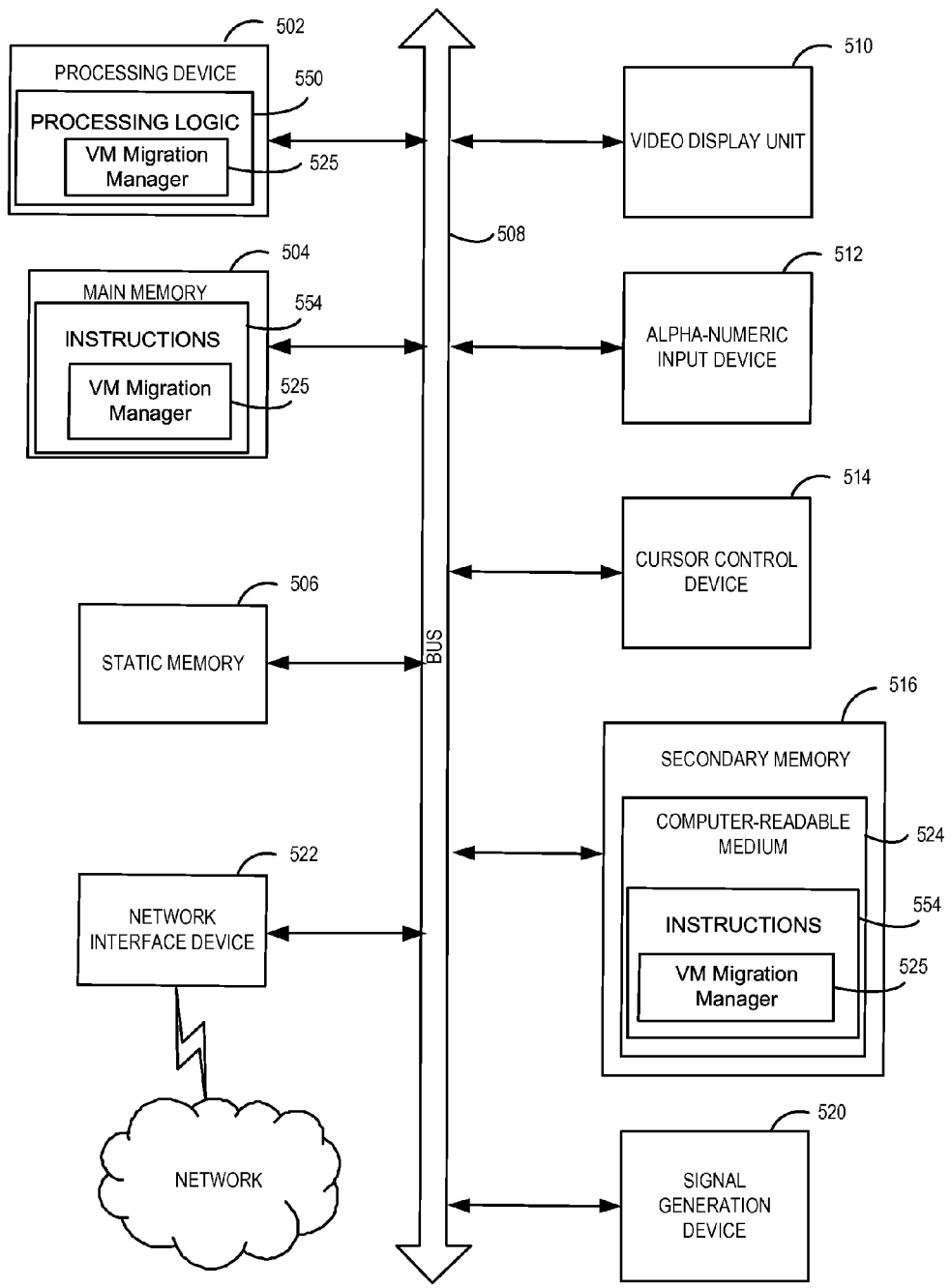
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., VM migration manager 525). The instructions 554 may also reside, completely or at least partially, within the main memory 504 and/or within the processing device 502 during execution thereof by the computer system 500 (where the main memory 504 and the processing device 502 constituting machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 may additionally include a VM migration manager module (not shown) for implementing the functionalities of the VM migration manager 160. The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "processing", "comparing", "adjusting", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
    maintaining, by a hypervisor executed by a processing device, a current scan identifier for each of a plurality of streams used to migrate a virtual machine;
    determining, by the hypervisor, when a current scan identifier of a first stream in the plurality of streams and a current scan identifier of a second stream in the plurality of streams are associated with different memory states of the virtual machine; and
    adjusting, by the hypervisor, processing of memory updates when the current scan identifier of the first stream and the current scan identifier of the second stream are associated with different memory states of the virtual machine.

2. The method of claim 1, further comprising:
    determining, by the hypervisor, an earliest current scan identifier among the plurality of streams.

3. The method of claim 2, wherein the adjusting comprises:
    pausing, by the hypervisor, processing on each stream having a current scan identifier subsequent to the earliest current scan identifier determined among the streams.

4. The method of claim 2, further comprising:
    processing, by the hypervisor, memory updates on each stream having a current scan identifier matching the earliest current scan identifier determined among the streams.

5. The method of claim 1, wherein the determining comprises:
    comparing, by the hypervisor, the current scan identifier of the first stream to the current scan identifier of the second stream.

6. The method of claim 1, further comprising:
    receiving, by the hypervisor, a first scan identifier on the first stream; and
    updating, by the hypervisor, a memory area to track the first scan identifier as the current scan identifier of the first stream.

7. The method of claim 6, further comprising:
    receiving, by the hypervisor, a first memory update associated with the first scan identifier on the first stream.

8. The method of claim 1, further comprising:
    receiving, by the hypervisor, a second scan identifier on the second stream; and
    updating, by the hypervisor, a memory area to track the second scan identifier as the current scan identifier of the second stream.

9. The method of claim 6, wherein one or more of the scan identifiers are received once on a respective stream for a plurality of corresponding memory updates.

10. The method of claim 6, wherein one or more of the scan identifiers are received with each corresponding memory update on a respective stream.

11. The method of claim 7, wherein the hypervisor tracks the current scan identifiers to apply memory updates received on the streams in order when migrating the virtual machine.

12. The method of claim 1, further comprising:
creating, by the hypervisor, the plurality of streams to migrate the virtual machine from a first hypervisor to a second hypervisor.

13. The method of claim 12, further comprising:
receiving a request to create an additional stream to migrate the virtual machine;
creating the additional stream; and
providing notification that the additional stream is available.

14. The method of claim 12, further comprising:
receiving a request to close a stream in the plurality of streams; and
providing notification that the stream requested to be closed is unavailable.

15. A non-transitory computer-readable medium having instructions recorded thereon, that when executed by a processing device, cause the processing device to perform operations, comprising:
maintaining, by a hypervisor executed by the processing device, a current scan identifier for each of a plurality of streams used to migrate a virtual machine;
determining, by the hypervisor, when a current scan identifier of a first stream in the plurality of streams and a current scan identifier of a second stream in the plurality of streams are associated with different memory states of the virtual machine; and
adjusting, by the hypervisor, processing of memory updates when the current scan identifier of the first stream and the current scan identifier of the second stream are associated with different memory states of the virtual machine.

16. The non-transitory computer-readable storage medium of claim 15, the operations further comprising:
determining, by the hypervisor, an earliest current scan identifier among the plurality of streams.

17. The non-transitory computer-readable storage medium of claim 16, wherein the operations further comprise:
pausing, by the hypervisor, processing on each stream having a current scan identifier subsequent to the earliest current scan identifier determined among the plurality of streams.

18. A system, comprising:
a memory;
a processing device; and
a hypervisor having access to the memory and executed by the processing device, wherein the hypervisor is to:
maintain a current scan identifier for each of a plurality of streams used to migrate a virtual machine;
determine when a current scan identifier of a first stream in the plurality of streams and a current scan identifier of a second stream in the plurality of streams are associated with different memory states of the virtual machine; and
adjust processing of memory updates when the current scan identifier of the first stream and the current scan identifier of the second stream are associated with different memory states of the virtual machine.

19. The system of claim 18, wherein the hypervisor further is to:
determine an earliest current scan identifier among the plurality of streams.

20. The system of claim 19, wherein the hypervisor further is to:
pause processing on each stream having a current scan identifier subsequent to the earliest current scan identifier determined among the plurality of streams.

21. The non-transitory computer-readable storage medium of claim 16, the operations further comprising:
processing, by the hypervisor, memory updates on each stream having a current scan identifier matching the earliest current scan identifier determined among the streams.

22. The non-transitory computer-readable storage medium of claim 15, the operations further comprising:
comparing, by the hypervisor, the current scan identifier of the first stream to the current scan identifier of the second stream.

23. The non-transitory computer-readable storage medium of claim 15, the operations further comprising:
receiving, by the hypervisor, a first scan identifier on the first stream; and
updating, by the hypervisor, a memory area to track the first scan identifier as the current scan identifier of the first stream.

24. The non-transitory computer-readable storage medium of claim 23, the operations further comprising:
receiving, by the hypervisor, a first memory update associated with the first scan identifier on the first stream.

25. The non-transitory computer-readable storage medium of claim 15, the operations further comprising:
receiving, by the hypervisor, a second scan identifier on the second stream; and
updating, by the hypervisor, a memory area to track the second scan identifier as the current scan identifier of the second stream.

26. The non-transitory computer-readable storage medium of claim 23, wherein one or more of the scan identifiers are received once on a respective stream for a plurality of corresponding memory updates.

27. The non-transitory computer-readable storage medium of claim 23, wherein one or more of the scan identifiers are received with each corresponding memory update on a respective stream.

28. The non-transitory computer-readable storage medium of claim 24, wherein the hypervisor tracks the current scan identifiers to apply memory updates received on the streams in order when migrating the virtual machine.

29. The non-transitory computer-readable storage medium of claim 15, the operations further comprising:
creating, by the hypervisor, the plurality of streams to migrate the virtual machine from a first hypervisor to a second hypervisor.

30. The non-transitory computer-readable storage medium of claim 29, the operations further comprising:
receiving a request to create an additional stream to migrate the virtual machine;
creating the additional stream; and
providing notification that the additional stream is available.

31. The non-transitory computer-readable storage medium of claim 29, the operations further comprising:
receiving a request to close a stream in the plurality of streams; and
providing notification that the stream requested to be closed is unavailable.

32. The system of claim 19, wherein the hypervisor further is to:
   process memory updates on each stream having a current scan identifier matching the earliest current scan identifier determined among the streams.

33. The system of claim 18, wherein the hypervisor further is to:
   compare the current scan identifier of the first stream to the current scan identifier of the second stream.

34. The system of claim 18, wherein the hypervisor further is to:
   receive a first scan identifier on the first stream; and
   update a memory area to track the first scan identifier as the current scan identifier of the first stream.

35. The system of claim 34, wherein the hypervisor further is to:
   receive a first memory update associated with the first scan identifier on the first stream.

36. The system of claim 18, wherein the hypervisor further is to:
   receive a second scan identifier on the second stream; and
   update a memory area to track the second scan identifier as the current scan identifier of the second stream.

37. The system of claim 34, wherein one or more of the scan identifiers are received once on a respective stream for a plurality of corresponding memory updates.

38. The system of claim 34, wherein one or more of the scan identifiers are received with each corresponding memory update on a respective stream.

39. The system of claim 35, wherein the hypervisor tracks the current scan identifiers to apply memory updates received on the streams in order when migrating the virtual machine.

40. The system of claim 18, wherein the hypervisor further is to:
   create the plurality of streams to migrate the virtual machine from a first hypervisor to a second hypervisor.

41. The system of claim 40, wherein the hypervisor further is to:
   receive a request to create an additional stream to migrate the virtual machine;
   create the additional stream; and
   provide notification that the additional stream is available.

42. The system of claim 40, wherein the hypervisor further is to:
   receive a request to close a stream in the plurality of streams; and
   provide notification that the stream requested to be closed is unavailable.

\* \* \* \* \*